(12) United States Patent
Kangude et al.

(10) Patent No.: US 8,458,504 B2
(45) Date of Patent: Jun. 4, 2013

(54) PEER-TO-PEER GROUP OWNER ENHANCED POWER MANAGEMENT

(75) Inventors: Shantanu Kangude, Dallas, TX (US);
Ariton E. Xhafa, Plano, TX (US);
Yanjun Sun, Richardson, TX (US);
Harshal S. Chhaya, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 348 days.

(21) Appl. No.: 12/817,821

(22) Filed: Jun. 17, 2010

(65) Prior Publication Data

US 2010/0325459 A1 Dec. 23, 2010

Related U.S. Application Data

(60) Provisional application No. 61/218,673, filed on Jun. 19, 2009, provisional application No. 61/221,367, filed on Jun. 29, 2009.

(51) Int. Cl.
| | | |
|---|---|---|
| G06F 1/00 | (2006.01) | |
| G06F 1/26 | (2006.01) | |
| G06F 15/16 | (2006.01) | |
| G06F 15/00 | (2006.01) | |
| G08C 17/00 | (2006.01) | |
| H04M 1/00 | (2006.01) | |

(52) U.S. Cl.
USPC ........... 713/323; 713/300; 370/311; 455/574; 709/203; 709/209; 712/28

(58) Field of Classification Search
USPC ... 713/320, 323; 370/311; 455/574; 709/203, 709/209; 712/28
See application file for complete search history.

(56) References Cited

U.S. PATENT DOCUMENTS

| 7,277,946 | B2 * | 10/2007 | Humphrey et al. | 709/226 |
|---|---|---|---|---|
| 8,001,220 | B2 * | 8/2011 | Lee et al. | 709/220 |
| 8,014,369 | B2 * | 9/2011 | Chou | 370/338 |
| 8,060,054 | B1 * | 11/2011 | Dinan et al. | 455/343.4 |
| 2005/0047357 | A1 | 3/2005 | Benveniste | |
| 2008/0133723 | A1 * | 6/2008 | Lee et al. | 709/222 |
| 2010/0271959 | A1 * | 10/2010 | Qi et al. | 370/248 |

OTHER PUBLICATIONS

Borges, Daniel et al., "Peer-to-Peer Technical Specification," The Wi-Fi Alliance, May 12, 2009, 107 pages.

* cited by examiner

*Primary Examiner* — Stefan Stoynov
(74) *Attorney, Agent, or Firm* — Steven A. Shaw; W. James Brady; Frederick J. Telecky, Jr.

(57) ABSTRACT

A device includes a peer-to-peer group owner processor. The device also includes a memory coupled to the peer-to-peer group owner processor. At least one client associated with the device is a legacy client, and the peer-to-peer group owner processor enters a listening state after a dozing state. The device consumes less power in the listening state than in an awake state.

19 Claims, 2 Drawing Sheets

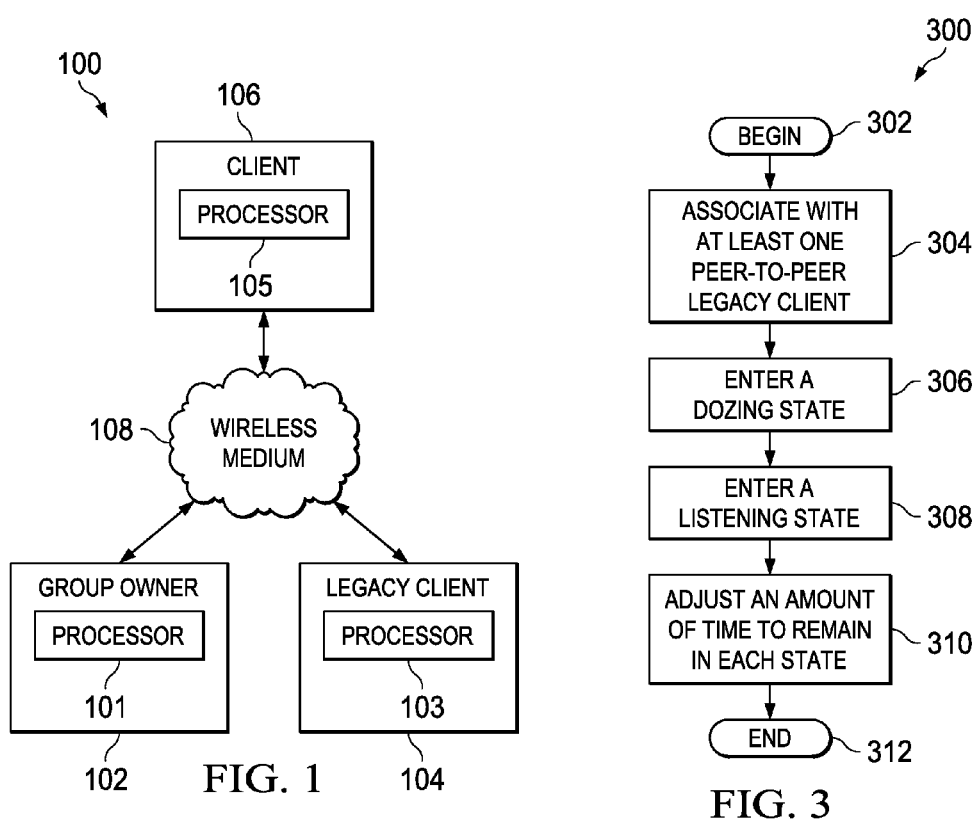
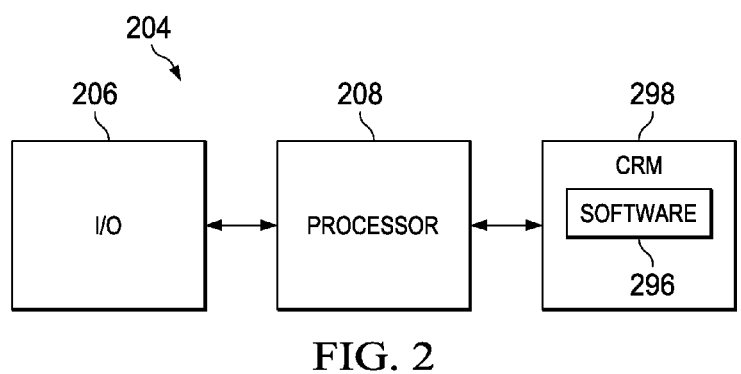

PEER-TO-PEER GROUP OWNER ENHANCED POWER MANAGEMENT

CROSS-REFERENCE TO RELATED APPLICATION

The present application claims priority to U.S. Provisional Patent Application No. 61/218,673, filed on Jun. 19, 2009 and U.S. Provisional Patent Application No. 61/221,367, filed on Jun. 29, 2009; both of which are hereby incorporated herein by reference.

BACKGROUND

Recent wireless technology implements power-saving features incompatible with legacy hardware. As such, businesses must replace entire networks of hardware to gain the advantage of the features.

SUMMARY

Devices, networks, and methods to implement a peer-to-peer group owner listening state are described herein. Accordingly, both power saving and compatibility are preserved.

In some disclosed embodiments, a device includes a peer-to-peer group owner processor. The device further includes memory coupled to the peer-to-peer group owner processor. At least one client associated with the device is a legacy client, and the peer-to-peer group owner processor enters a listening state after a dozing state. The device consumes less power in the listening state than in an awake state.

In yet other disclosed embodiments, a network includes a peer-to-peer group owner. The network further includes at least one legacy client associated with the peer-to-peer group owner and coupled to the peer-to-peer group owner. The peer-to-peer group owner enters a listening state after a dozing state, and the peer-to-peer group owner consumes less power in the listening state than in an awake state.

In at least some disclosed embodiments, a machine-readable storage medium includes computer-executable instructions that, when executed by a processor, cause the processor to associate with at least one peer-to-peer legacy client. The processor is further caused to enter a dozing state and enter a listening state after entering the dozing state. The processor is further caused to consume less power in the listening state than in an awake state.

These and other features and advantages will be more clearly understood from the following detailed description taken in conjunction with the accompanying drawings and claims.

BRIEF DESCRIPTION OF THE DRAWINGS

For a more complete understanding of the present disclosure, reference is now made to the accompanying drawings and detailed description, wherein like reference numerals represent like parts:

FIG. 1 illustrates a network implementing a listening state in accordance with at least some illustrative embodiments;

FIG. 2 illustrates a machine-readable storage medium implementing a listening state in accordance with at least some illustrative embodiments;

FIG. 3 illustrates a method of implementing a listening sate in accordance with at lest some illustrative embodiments;

NOTATION AND NOMENCLATURE

Figure 4:
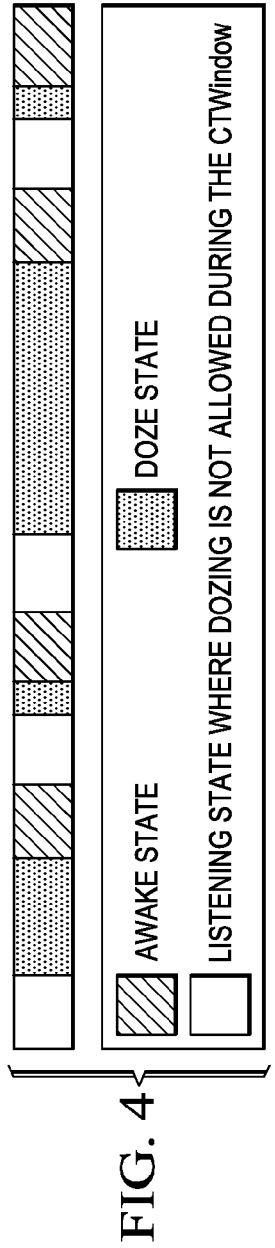
FIGS. 4 and 5 illustrate adjustment of the timing and periodicity of states in accordance with at least some illustrative embodiments.

Certain terms are used throughout the following claims and description to refer to particular components. As one skilled in the art will appreciate, different entities may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean an optical, wireless, indirect electrical, or direct electrical connection. Thus, if a first device couples to a second device, that connection may be through an indirect electrical connection via other devices and connections, through a direct optical connection, etc. Additionally, the term "system" refers to a collection of two or more hardware components, and the term may be used to refer to an electronic device or a combination of electronic devices.

A station ("STA") is any device that contains a medium access control ("MAC") and physical layer ("PHY") interface to a wireless medium. An access point ("AP") is any entity that has STA functionality and provides access to distribution services via the wireless medium for associated STAs. STAs and APs can be readily interchanged in many circumstances.

Peer-to-peer ("P2P") is a specific communication protocol used by wireless devices as enumerated in the Peer-to-Peer Technical Specification Rev. 1.0, May 12, 2009, by the Peer-to-Peer Technical Task Group and hereby incorporated by reference.

A legacy client is a STA that is not compliant with P2P standards. A client is a P2P STA or a legacy client that is connected to a P2P group owner.

A P2P group owner ("group owner") is an entity that provides and uses connectivity between associated clients and shares many properties of an AP.

A listen state is a mode of operation in which a P2P device dwells on a communication channel.

AP is an abbreviation for access point.
CTWindow is an abbreviation for client traffic window.
GO is an abbreviation for group owner.
OppPS is an abbreviation for opportunistic power save.
P2P is an abbreviation for peer-to-peer.
PS is an abbreviation for power save.
STA is an abbreviation for station.
TIM is an abbreviation for traffic information map.
TBTT is an abbreviation for target beacon transmission time.
WMM-PS is an abbreviation for wireless multi-media power save.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one having ordinary skill in the art will understand that the following description has broad application, and the discussion of any embodiment is meant only to be exemplary of that embodiment, and not intended to intimate that the scope of the disclosure, including the claims, is limited to that embodiment.

FIG. 1 illustrates a network 100 according to at least one illustrative embodiment. The network 100 comprises a group owner 102, a legacy client 104, and a client 106. Each of the network components comprises a processor 101, 103, 105 and memory (not shown) coupled to the processor. In at least one embodiment, any or all of the processors 101, 103, 105 are p2p processors, which handle P2P transactions, execute P2P instructions, and/or communicate via P2P protocol. The network components communicate through a wireless medium 108. The legacy client 104 and client 106 are associated with the group owner 102, i.e., the group owner 102 uses and provides for communication between the legacy client 104 and the client 106. The network 100 may comprise any number of network components, including more than one of the same component, in any configuration of association.

Legacy clients 104 do not understand the P2P protocol and consider the P2P group owner to be an AP. Legacy clients 104 expect an AP to be available at all times and any mechanism that alters availability (for example in order to save power) may result in undesirable consequences, e.g. needless consumption of spectrum due to multiple retries of communication or disassociation between the legacy client 104 and the AP. As such, group owners 102 associated with legacy clients 104 and not implementing the instant disclosure remain in a fully awake state. However, remaining in an awake state results in significant power consumption.

A discussion of power-saving features available to the group owner 102 when not associated with legacy clients 104 will be helpful. Two such features are opportunistic power save ("OppPS") and notice of absence. OppPS saves power by allowing the group owner to "doze," i.e., go to sleep by entering a dormant state that uses little or no power. In order to counteract any unpredictability of dozing, the group owner 102 advertises periods when it will be awake. Such a period is called the client traffic window or CTWindow. The CTWindow usually begins with a beacon frame emitted at a target beacon transmission time ("TBTT"), and extends for the chosen duration represented by the CTWindow value. The beacon alerts clients 106 of the presence of the group owner 102. Clients 106 may request that the group owner be awake at specific time other than during the CTWindow.

At any time after the end of each CTWindow, if the group owner 102 determines that the clients 106 themselves are in power save mode, the group owner may enter a doze state until the next TBTT. However, as long as any client 106 is not in power save mode, the group owner 102 will remain awake.

Instead of advertising when the group owner 102 will be awake, the group owner 102 can advertise when it will be dozing using a notice of absence. Accordingly, the group owner 102 specifies a start time, duration, and count. The start time indicates the start time of each doze. The duration indicates the length of each doze. The count indicates the number of doze periods. However, it may take a number of discrete time information map intervals to communicate new, updated, or cancelled notices of absence to the clients 106. As such, notice of absence start times should be set far in advance, thus decreasing any flexibility to respond to changing network conditions.

One power-saving feature used by legacy clients 104 themselves is wireless multi-media power save ("WMM PS"). The WMM PS feature allows a legacy client 104 to send an AP a trigger packet, which causes the AP to deliver any pending packets to the legacy client 104. Such trigger packets are unscheduled and may occur at any time. As such, an associated group owner 102, which the legacy client 104 expects to behave as the AP, is prevented from dozing.

In addition to overcoming the drawbacks outlined above, the instant disclosure allows group owners 102 to be compatible with legacy clients 104. By cycling between at least three states, the awake state, the listening state, and the dozing state (listed in order of decreasing power consumption), the group owner 102 saves power when used with legacy clients 104. Furthermore, by adjusting the length of the different states during operation, the group owner 102 can adapt to changing network 100 conditions to maintain or increase power saving capabilities.

Returning to FIG. 1, the group owner 102 is allowed to doze, even when associated with legacy clients 104, in at least some embodiments. In at least one embodiment, the group owner 102 enters a listening state after a dozing state. In the listening state, the group owner 102 dwells on the communication channel. In at least one embodiment, the group owner 102 dwells on the communication channel by detecting energy, traffic, and/or communication on the channel. In response, the group owner 102 enters the awake state. The group owner 102 may also enter the awake state if a beacon transmission is due. In at least one embodiment, if the group owner 102 detects no energy, no traffic, and/or no communication, the group owner 102 returns to the dozing state.

In at least one embodiment, the dozing state is available for group owner 102 if a majority of clients 104, 106 associated with the device are not WMM PS enabled, but the group owner 102 will not enter the dozing state if a majority of clients 104, 106 are WMM PS enabled. The dozing state is available, in at least one embodiment, for the group owner 102 if a majority of clients 104, 106 associated with the group owner 102 are power mode enabled. Power mode is a feature allowing clients 104, 106 themselves to doze, but wake up at the TBTT.

The amount of time the group owner 102 remains in the each state is adjustable during operation. In at least one embodiment, the amount of doze time is increased proportionally to the decrease in quantity of transmissions from the legacy client. The amount of awake time, in at least one embodiment, is increased if at least one client associated with the device is not power mode enabled. In some embodiments, the amount of wake time is increased if at least one client 104, 106 is WMM PS enabled, a packet with a retry bit is received, and/or if any client 104, 106 re-associates with the group owner 102. The above conditions can be used in combination and with other conditions to increase network 100 efficiency.

Using such conditions for increasing or decreasing the amount of time the group owner 102 remains in the doze, listening, and awake state allows for power saving while maintaining efficient service to legacy clients 104. For example, the doze state can be increased each TBTT until the group owner 102 receives notification of a retried communication. As such, the group owner 102 can return to the penultimate doze period and be assured that the doze period is maximized, but not at the expense of retried communications. As another example, the awake state may be increased by a set amount for each new legacy client 104 added to the network 100 and decreased by a set amount for each new legacy client 104 removed from the network 100. Such a rule may be ideal for customers who want to accommodate rapidly changing network hardware without processing network data regarding legacy client 104 traffic. As such, the rules for state times may be created and implemented to reflect the values important to each customer.

FIG. 3 illustrates a method of implementing a listening state beginning at 302 and ending at 312. At 304, an association is made with at least one legacy client. At 306, a dozing state is entered. At 308, a listening state is entered after the dozing state. In at least one embodiment, the listening state consumes less power than an awake state. At 310, an amount of time to remain in one or each of the states is adjusted. For example, the amount of time to remain in the dozing state is increased proportionally to the decrease in quantity of transmissions from the peer-to-peer legacy client. As another example, the amount of time to remain in the awake state is increased if at least one client is not power mode enabled or if at least one client is wireless multi-media power save enabled.

Figure 5:
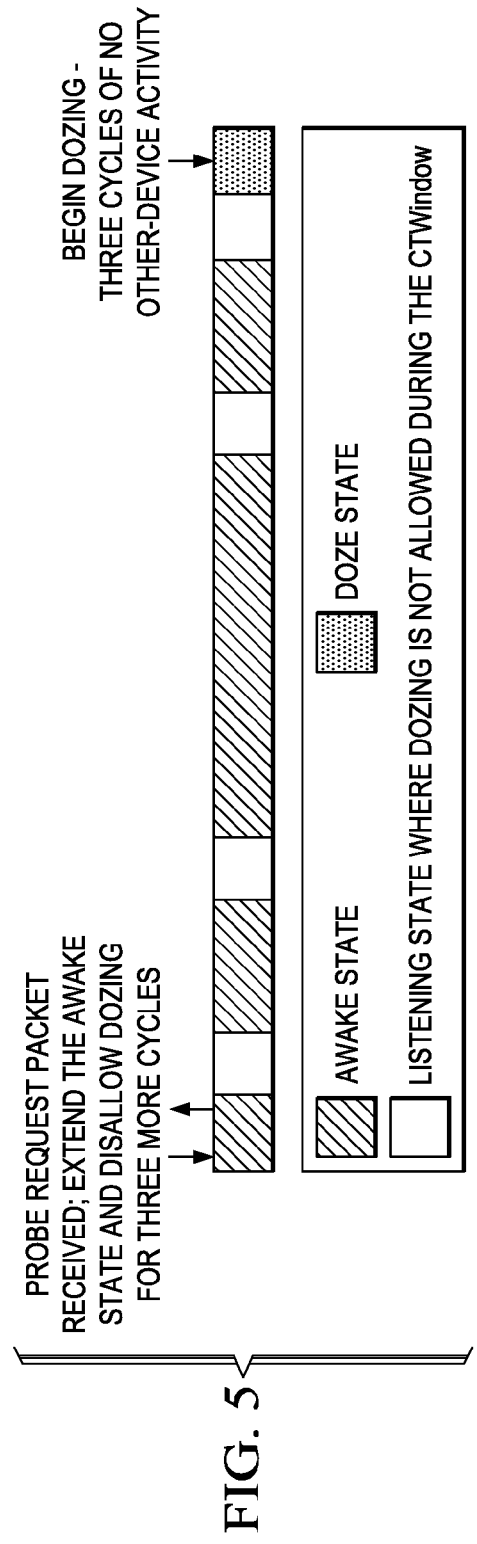

FIGS. 4 and 5 illustrate more complex conditions or rules for adjusting the timing and periodicity of each state. Each pattern illustrates the time in a particular state from left to right. In FIG. 4, the time to remain in the dozing state is adjusted for each cycle of the listen/doze/awake period, but the time to remain in the listen state and awake state are not adjusted. Also, dozing is not allowed during the CTWindow. In FIG. 5, a probe request packet is received, and consequently dozing is not allowed for 3 more cycles and the awake state is extended for two cycles. Although FIGS. 4 and 5 represent two examples of rule combinations governing the timing and periodicity of each state, many other examples are possible to allow for efficient adaptation to network conditions.

The system described above may be implemented on any particular machine or computer with sufficient processing power, memory resources, and throughput capability to handle the necessary workload placed upon the computer. FIG. 2 illustrates a particular computer system 204 suitable for implementing one or more embodiments disclosed herein. The computer system 204 includes a processor 208 (which may be referred to as a central processor unit, CPU, or group owner processor) that is in communication with memory devices including storage 298, and input/output (I/O) 206 devices. The processor may be implemented as one or more CPU chips.

In various embodiments, the storage 298 comprises a computer-readable medium such as volatile memory (e.g., RAM), non-volatile storage (e.g., Flash memory, hard disk drive, CD ROM, etc.), or combinations thereof. The storage 298 comprises software 296 that is executed by the processor 208. One or more of the actions described herein are performed by the processor 208 during execution of the software 296.

Other conditions and combinations of conditions will become apparent to those skilled in the art, including the combination of the conditions described above, and all such conditions and combinations are within the scope of the present disclosure. Additionally, audio or visual alerts may be triggered upon successful completion of any action described herein, upon unsuccessful actions described herein, and upon errors.

The above disclosure is meant to be illustrative of the principles and various embodiment of the present invention. Numerous variations and modifications will become apparent to those skilled in the art once the above disclosure is fully appreciated. It is intended that the following claims be interpreted to embrace all variations and modifications.

What is claimed is:

1. A device, comprising:
   a peer-to-peer group owner processor handling a plurality of peer-to-peer transactions;
   memory coupled to the peer-to-peer group owner processor;
   wherein at least one client associated with the device is a legacy client;
   wherein the peer-to-peer group owner processor enters a listening state after a dozing state, wherein the dozing state is available for peer-to-peer group owner processor if a majority of clients associated with the device are not wireless multi-media power save enabled; and
   wherein the device consumes less power in the listening state than in an awake state.

2. The device of claim 1, wherein an amount of time the peer-to-peer group owner processor remains in the dozing state is adjustable during operation.

3. The device of claim 2, wherein the amount of time is increased proportionally to the decrease in quantity of transmissions from the legacy client.

4. The device of claim 1, wherein an amount of time the peer-to-peer group owner processor remains in the awake state is adjustable during operation.

5. The device of claim 4, wherein the amount of time is increased if at least one client associated with the device is not power mode enabled.

6. The device of claim 4, wherein the amount of time is increased if at least one client associated with the device is wireless multi-media power save enabled.

7. The device of claim 4, wherein the amount of time is increased if a packet with a retry bit is received.

8. The device of claim 4, wherein the amount of time is increased if any client re-associates with the device.

9. A device, comprising:
   a peer-to-peer group owner processor handling a plurality of peer-to-peer transactions;
   memory coupled to the peer-to-peer group owner processor;
   wherein at least one client associated with the device is a legacy client;
   wherein the peer-to-peer group owner processor enters a listening state after a dozing state, wherein the dozing state is available for peer-to-peer group owner processor if a majority of clients associated with the device are power mode enabled; and
   wherein the device consumes less power in the listening state than in an awake state.

10. A method, comprising:
    associating with at least one peer-to-peer legacy client;
    entering a dozing state;
    entering a listening state after entering the dozing state;
    consuming less power in the listening state than in an awake state; and
    increasing an amount of time to remain in the awake state if at least one client is not power mode enabled.

11. The method of claim 10, further comprising adjusting an amount of time to remain in the dozing state, wherein the amount of time is increased proportionally to the decrease in quantity of transmissions from the peer-to-peer legacy client.

12. A method, comprising:
    associating with at least one peer-to-peer legacy client;
    entering a dozing state;
    entering a listening state after entering the dozing state;
    consuming less power in the listening state than in an awake state; and
    increasing an amount of time to remain in the awake state if at least one client is wireless multi-media power save enabled.

13. A non-transitory machine-readable storage medium comprising computer-executable instructions that, when executed by a processor, cause the processor to:
    associate with at least one peer-to-peer legacy client;
    enter a dozing state;
    enter a listening state after entering the dozing state;

consume less power in the listening state than in an awake state; and increase an amount of time to remain in the awake state if at least one client is not power mode enabled.

14. The medium of claim 13, wherein the processor is further caused to adjust an amount of time to remain in the dozing state, wherein the amount of time is increased proportionally to the decrease in quantity of transmissions from the peer-to-peer legacy client.

15. A non-transitory machine-readable storage medium comprising computer-executable instructions that, when executed by a processor, cause the processor to:

associate with at least one peer-to-peer legacy client;
enter a dozing state;
enter a listening state after entering the dozing state;
consume less power in the listening state than in an awake state; and
increase an amount of time to remain in the awake state if at least one client is wireless multi-media power save enabled.

16. A device, comprising:
a peer-to-peer group owner processor handling a plurality of peer-to-peer transactions;
memory coupled to the peer-to-peer group owner processor;
wherein at least one client associated with the device is a legacy client;
wherein the peer-to-peer group owner processor enters a listening state after a dozing state;
wherein the device consumes less power in the listening state than in an awake state, wherein an amount of time the peer-to-peer group owner processor remains in the awake state is increased during operation if at least one client associated with the device is not power mode enabled.

17. A device, comprising:
a peer-to-peer group owner processor handling a plurality of peer-to-peer transactions;
memory coupled to the peer-to-peer group owner processor;
wherein at least one client associated with the device is a legacy client;
wherein the peer-to-peer group owner processor enters a listening state after a dozing state;
wherein the device consumes less power in the listening state than in an awake state, wherein an amount of time the peer-to-peer group owner processor remains in the awake state is increased during operation if at least one client associated with the device is wireless multi-media power save enabled.

18. A device, comprising:
a peer-to-peer group owner processor handling a plurality of peer-to-peer transactions;
memory coupled to the peer-to-peer group owner processor;
wherein at least one client associated with the device is a legacy client;
wherein the peer-to-peer group owner processor enters a listening state after a dozing state;
wherein the device consumes less power in the listening state than in an awake state, wherein an amount of time the peer-to-peer group owner processor remains in the awake state is increased during operation if a packet with a retry bit is received.

19. A device, comprising:
a peer-to-peer group owner processor handling a plurality of peer-to-peer transactions;
memory coupled to the peer-to-peer group owner processor;
wherein at least one client associated with the device is a legacy client;
wherein the peer-to-peer group owner processor enters a listening state after a dozing state;
wherein the device consumes less power in the listening state than in an awake state, wherein an amount of time the peer-to-peer group owner processor remains in the awake state is increased during operation if any client re-associates with the device.

* * * * *